(12) United States Patent
Bharadwaj et al.

(10) Patent No.: US 12,210,398 B2
(45) Date of Patent: *Jan. 28, 2025

(54) COMPILER DIRECTED FINE GRAINED POWER MANAGEMENT

(71) Applicant: Advanced Micro Devices, Inc., Santa Clara, CA (US)

(72) Inventors: Vedula Venkata Srikant Bharadwaj, Bellevue, WA (US); Shomit N. Das, Pflugerville, TX (US); Anthony T. Gutierrez, Bellevue, WA (US); Vignesh Adhinarayanan, Austin, TX (US)

(73) Assignee: Advanced Micro Devices, Inc.

( * ) Notice: Subject to any disclaimer, the term of this patent is extended or adjusted under 35 U.S.C. 154(b) by 15 days.

This patent is subject to a terminal disclaimer.

(21) Appl. No.: 18/346,380

(22) Filed: Jul. 3, 2023

(65) Prior Publication Data

US 2023/0350485 A1 Nov. 2, 2023

Related U.S. Application Data

(63) Continuation of application No. 17/033,000, filed on Sep. 25, 2020, now Pat. No. 11,726,546.

(51) Int. Cl.
*G06F 1/32* (2019.01)
*G06F 1/26* (2006.01)
*G06F 1/324* (2019.01)
*G06F 1/3287* (2019.01)
*G06F 1/3296* (2019.01)
*G06F 9/50* (2006.01)

(52) U.S. Cl.
CPC ............ *G06F 1/3287* (2013.01); *G06F 1/324* (2013.01); *G06F 1/3296* (2013.01); *G06F 9/50* (2013.01)

(58) Field of Classification Search
CPC ...... G06F 1/3287; G06F 1/324; G06F 1/3296; G06F 1/329; G06F 1/3228; G06F 9/50; Y02D 10/00
See application file for complete search history.

(56) References Cited

U.S. PATENT DOCUMENTS

| | | |
|---|---|---|
| 6,477,654 B1 | 11/2002 | Dean |
| 2013/0086565 A1 | 4/2013 | Gaster |
| 2014/0136816 A1 | 5/2014 | Krig |
| 2015/0160715 A1 | 6/2015 | Chung |
| 2020/0183485 A1 | 6/2020 | Das et al. |

OTHER PUBLICATIONS

Lee, Jungseob et al., "Improving Throughput of Power-Constrained GPUs Using Dynamic Voltage/Frequency and Core Scaling," In International Conference on Parallel Architectures and Compilation Techniques (PACT), pp. 111-120. IEEE, 2011.

(Continued)

*Primary Examiner* — Nitin C Patel
(74) *Attorney, Agent, or Firm* — Volpe Koenig

(57) ABSTRACT

Systems, methods, devices, and computer-implemented instructions for processor power management implemented in a compiler. In some implementations, a characteristic of code is determined. An instruction based on the determined characteristic is inserted into the code. The code and inserted instruction are compiled to generate compiled code. The compiled code is output.

20 Claims, 8 Drawing Sheets

(56) References Cited

OTHER PUBLICATIONS

Sethia, Ankit et al. "Equalizer: Dynamic Tuning of GPU Resources for Efficient Execution," In IEEE/ACM International Symposium on Microarchitecture (MICRO), pp. 647-658. IEEE Computer Society, Dec. 2014.
Paul Indrani et al. "Coordinated Energy Management in Heterogeneous Processors," SC '13: Proceedings of the International Conference on High Performance Computing, Networking, Storage and Analysis, 93-108, IEEE, Denver, CO, USA, Nov. 17-22, 2013.
Paul, Indrani et al. "Cooperative Boosting: Needy Versus Greedy Power Management" ISCA '13: Proceedings of the 40th Annual International Symposium on Computer Architecture, pp. 285-296. ACM, Jun. 2013.
Majumdar, Abhinandan et al., "Dynamic GPGPU Power Management Using Adaptive Model Predictive Control" In International Symposium on High-Performance Computer Architecture (HPCA), pp. 613-624. IEEE, Austin, TX, USA, Feb. 4-8, 2017.
Chen, Tianqi et al., "TVM: An Automated End-to-End Optimizing Compiler for Deep Learning." In USENIX Symposium on Operating Systems Design and Implementation (OSDI), pp. 579-594. ACM, Oct. 2018.
Chandrasekhar, Anupama et al., "IGC: The Open Source Intel Graphics Compiler," In IEEE/ACM International Symposium on Code Generation and Optimization (CGO), pp. 254-265. ACM, 2019.
Molka, Daniel et al. "Detecting Memory-Boundedness with Hardware Performance Counters," Proceedings of the 8th ACM/SPEC on International Conference on Performance Engineering, pp. 27-38. ACM, L'Aquila, Italy, Apr. 22-26, 2017.

COMPILER DIRECTED FINE GRAINED POWER MANAGEMENT

CROSS REFERENCE TO RELATED APPLICATION

This application is a continuation of U.S. patent application Ser. No. 17/033,000, filed Sep. 25, 2020 now U.S. Pat. No. 11,726,546, issued on Aug. 15, 2023, which is incorporated by reference as if fully set forth.

GOVERNMENT LICENSE RIGHTS

This invention was made with government support under the PathForward Project with Lawrence Livermore National Security (Prime Contract No. DE-AC52-07NA27344, Subcontract No. B620717) awarded by the United States Department of Energy (DOE). The Government has certain rights in this invention.

BACKGROUND

The performance of processors (e.g., CPUs, GPUs, etc.) is typically constrained by energy efficiency, among other things. For example, in the high performance computing (HPC) and data center market segments, improvements in energy efficiency can lower the total cost of ownership (TCO) of a system incorporating the processor. In the gaming and desktop segments, improvements in energy efficiency can yield improved frame rates and reduced acoustic noise.

In some processors, energy consumption is managed using dynamic voltage and/or frequency scaling (DVFS) techniques. DVFS techniques typically adjust the frequency and supply voltage to particular components, regions, or domains within the processor, such as processor cores, memory components including cache memory, and interconnect. DVFS techniques balance energy consumption with latency or other performance metrics. Current approaches to DVFS involve observing the energy consumption characteristics and performance of a kernel running on the processor during a certain time period, and predicting an optimal DVFS state for an upcoming time period based on the observed characteristics. Such reactive approaches rely on an underlying assumption that an optimum state for the upcoming time period is determinable based on the characteristics of the observed time period.

In some cases, an application running on a processor includes multiple phases of operation, each phase having different energy consumption characteristics.

BRIEF DESCRIPTION OF THE DRAWINGS

A more detailed understanding can be had from the following description, given by way of example in conjunction with the accompanying drawings wherein.

DETAILED DESCRIPTION

Figure 1:
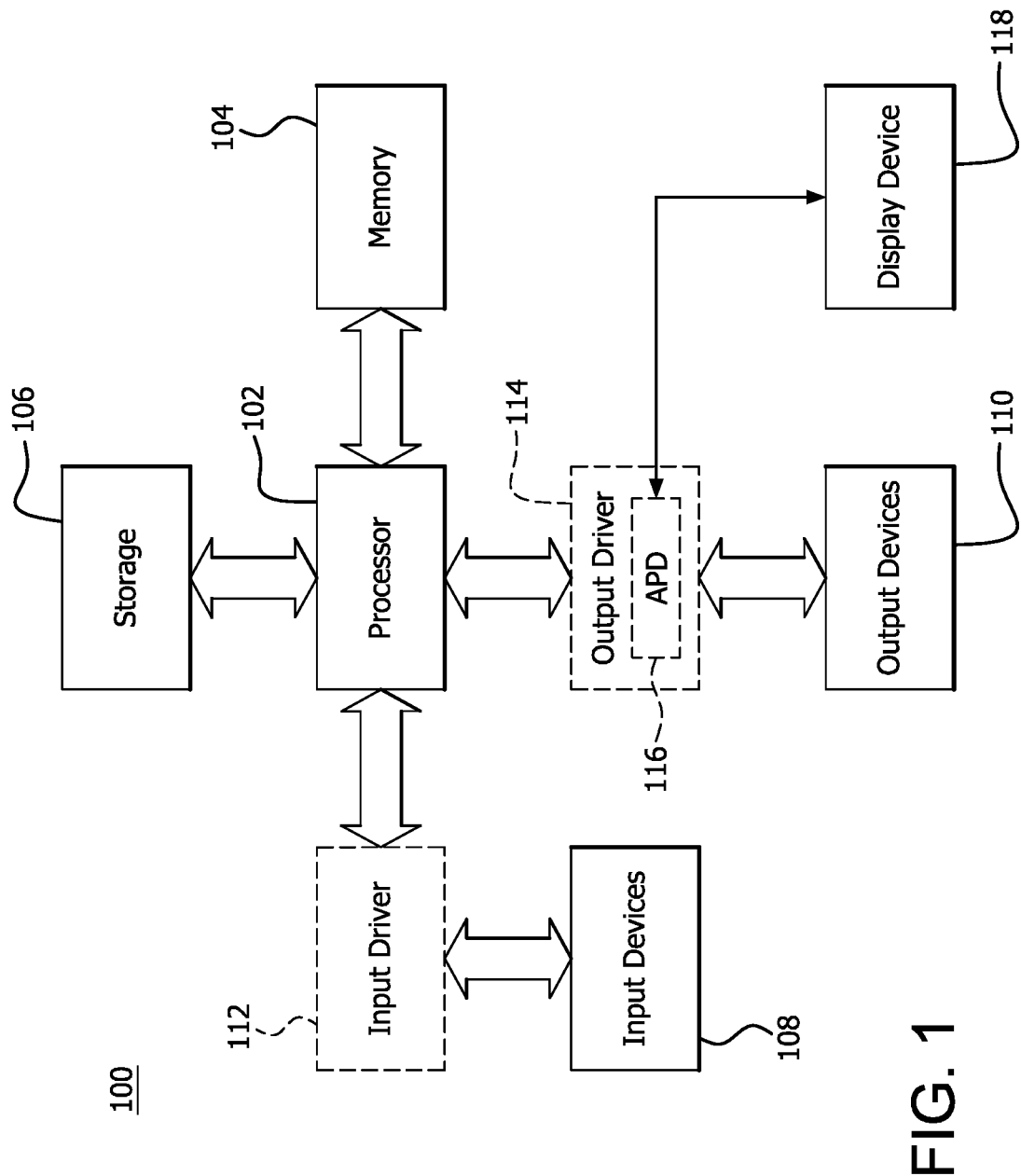
FIG. 1 is a block diagram of an example device in which one or more features of the disclosure can be implemented.

Some implementations provide a method of processor power management implemented in a compiler. A characteristic of code is determined. An instruction based on the determined characteristic is inserted into the code. The code and inserted instruction are compiled to generate compiled code. The compiled code is output.

In some implementations, the instruction causes a target processor to write information that is based on the characteristic to a special purpose register for reading by hardware of the target processor. In some implementations, the characteristic includes a characteristic of a subset of the code. In some implementations, the instruction is based on an energy consumption characteristic of the code. In some implementations, the instruction indicates an energy consumption characteristic of a subset of the code. In some implementations, the instruction indicates an energy management state of a target processor. In some implementations, the instruction indicates a preferred clock gating configuration or a preferred power gating configuration of a target processor. In some implementations, the instruction indicates a preferred SIMD width of a target processor. In some implementations, the instruction includes a compiler hint.

Some implementations provide a computing device configured to compile code, circuitry configured to determine a characteristic of code. The computing device includes circuitry configured to insert an instruction based on the characteristic into the code, circuitry configured to compile the code and inserted instruction to generate compiled code, and circuitry configured to output the compiled code.

In some implementations, the instruction is configured to cause a target processor to write information that is based on the characteristic to a special purpose register for reading by hardware of the target processor. In some implementations, the characteristic includes a characteristic of a subset of the code. In some implementations, the instruction is based on an energy consumption characteristic of the code. In some implementations, the instruction indicates an energy consumption characteristic of a subset of the code. In some implementations, the instruction indicates an energy management state of a target processor. In some implementations, the instruction indicates a preferred clock gating configuration or a preferred power gating configuration of a target processor. In some implementations, the instruction indicates a preferred SIMD width of a target processor. In some implementations, the instruction includes a compiler hint.

Some implementations provide a non-transitory computer readable medium having instructions stored thereon which when executed by a processor cause the processor to execute an executable compiled from code. The executable includes an instruction based on a characteristic of the code. Execution of the instruction writes information to a register of the processor.

In some implementations, the information includes an energy consumption characteristic or an energy management state. Some implementations provide a method of processor power management implemented in a compiler. Application code is input to the compiler. The application code is analyzed by the compiler to determine an energy consumption characteristic of the application code. An instruction that is based on the determined energy consumption characteristic is inserted into the application code to generate energy consumption aware code. The energy consumption aware code is compiled to generate compiled code. The compiled code is output from the compiler.

In some implementations, the instruction causes a target processor to write information that is based on the energy consumption characteristic to a special purpose register for reading by energy management hardware of the target processor. In some implementations, the energy consumption characteristic includes an energy consumption characteristic of a subset of the code. In some implementations, the instruction is based on an energy consumption characteristic of a subset of the code. In some implementations, the instruction indicates an energy consumption characteristic of a subset of the code. In some implementations, the instruction indicates an energy management state of a target processor. In some implementations, the instruction indicates a preferred clock gating configuration or a preferred power gating configuration of a target processor. In some implementations, the instruction indicates a preferred single-instruction-multiple-data ("SIMD") width of a target processor. In some implementations, the instruction includes a compiler hint.

Some implementations provide a computing device configured to compile code. The computing device includes circuitry configured to input application code, circuitry configured to analyze the application code to determine an energy consumption characteristic of the code, circuitry configured to insert an instruction that is based on the energy consumption characteristic into the code to generate energy consumption aware code, circuitry configured to compile the energy consumption aware code to generate compiled code, and circuitry configured to output the compiled code.

In some implementations, the instruction is configured to cause a target processor to write information that is based on the energy consumption characteristic to a special purpose register for reading by energy management hardware of the target processor. In some implementations, the energy consumption characteristic includes an energy consumption characteristic of a subset of the code. In some implementations, the instruction is based on an energy consumption characteristic of a subset of the code. In some implementations, the instruction indicates an energy consumption characteristic of a subset of the code. In some implementations, the instruction indicates an energy management state of a target processor. In some implementations, the instruction indicates a preferred clock gating configuration or a preferred power gating configuration of a target processor. In some implementations, the instruction indicates a preferred SIMD width of a target processor. In some implementations, the instruction includes a compiler hint.

Some implementations provide a non-transitory computer readable medium storing instructions to cause a processor to input application code, analyze the application code to determine an energy consumption characteristic of the code, insert an energy management instruction that is based on the determined energy consumption characteristic into the code to generate energy consumption aware code, compile the energy consumption aware code to generate compiled code, and output the compiled code.

In some implementations, the inserted energy management instruction is configured to cause a target processor to write information that is based on the energy consumption characteristic to a special purpose register for reading by energy management hardware of the target processor.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a SIMD paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
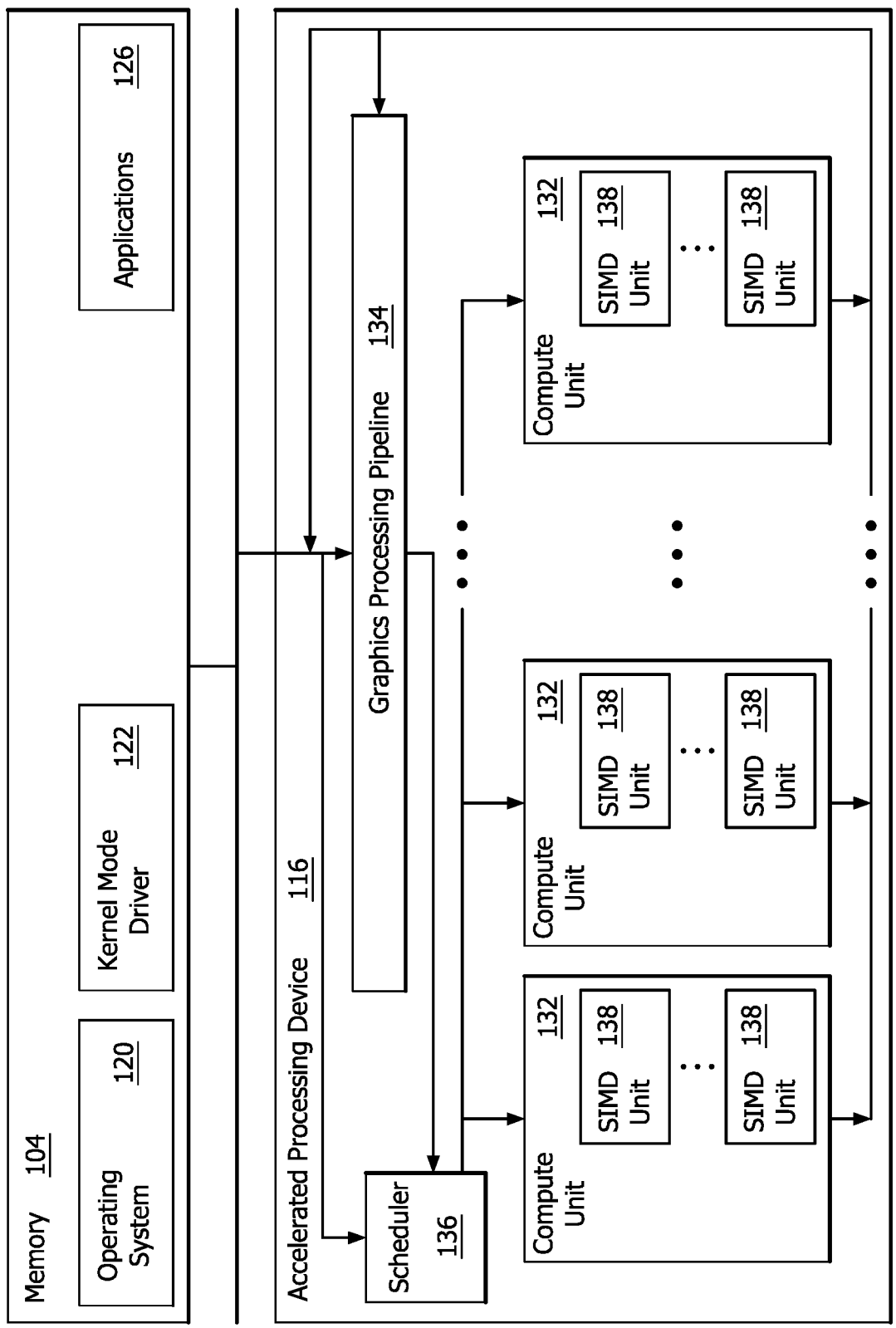
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Energy management techniques typically adjust clock frequency, voltage, and other energy management aspects of hardware operation based on which portions of the hardware are in use, or likely to be in use, during a time period of interest.

For example, "compute-intensive" application code (or a section thereof) typically operates compute resources primarily, such as ALU and register file hardware, and does not operate, or only secondarily operates other resources, such as a memory address register (MAR) memory buffer register (MBR), address bus, data bus, and/or other memory-specific hardware, in some implementations. Accordingly, an energy management device on the processor adjusts energy management aspects of the hardware during execution of compute-intensive application code accordingly. For example, in some implementations the energy management device increases clock frequency and/or voltage to an ALU and register file, and decreases clock frequency and/or voltage to a memory address register (MAR) memory buffer register (MBR), address bus, and data bus.

"Memory-intensive" application code (or a section thereof) typically operates memory resources primarily, such as a memory address register (MAR) memory buffer register (MBR), address bus, data bus, etc., and does not operate, or only secondarily operates other resources, such as an ALU and register file hardware, and/or other compute-specific hardware, in some implementations. Accordingly, an energy management device on the processor adjusts energy management aspects of the hardware during execution of memory-intensive application code accordingly. For example, in some implementations the energy management device increases clock frequency and/or voltage to an ALU and register file, and decreases clock frequency and/or voltage to memory.

"Cache-intensive" application code (or a section thereof) is typically primarily involved in cache management operations, and energy management hardware adjusts clock frequency, voltage, and/or other energy management aspects accordingly. The focus or "intensity" of application code is definable for any other arbitrary collection of processor resources as desired, in addition to or alternatively to the foregoing compute-intensive, memory-intensive, and cache-intensive, foci, which are simply convenient examples herein.

DVFS increases the efficiency of processing devices, such as GPUs, in some cases. Clock and/or power gating is also usable to increase the efficiency of processing devices, such as GPUs. For example, in some cases, a large fraction of GPU power is consumed by SIMD units. These SIMD units are often underutilized however, and compute-intensive applications typically show low sensitivity to SIMD width. Accordingly, many high-performance computing (HPC), machine learning (ML) and/or compute-intensive applications lose no (or relatively less as compared with other types of applications) performance when executing on a processor using different SIMD widths; e.g., SIMD8, SIMD16, SIMD32, or SIMD64. In some cases this is because such compute-intensive applications tend to have irregular control flow and memory access patterns, and thus many SIMD lanes are underutilized and threads incur long-latency memory stalls. Existing hardware is only capable of clock-gating an entire SIMD unit, and clock-gating policies are entirely reactive (e.g., the SIMD unit is clock gated on a condition that the SIMD pipeline has drained and no instructions have been issued for ~10 cycles). Accordingly, some implementations include a processing device configured to clock gate individual MACC hardware, or other individual devices, of a SIMD device. In some implementations, this provides the advantage of facilitating a compiler in making highly effective and timely determinations of an appropriate SIMD width for fine-grained phases of an application.

In some cases, techniques and devices discussed herein provide the advantage of optimally choosing (e.g., by a compiler) the voltage-frequency points and/or energy management states (e.g., P-states) for various components within a processor, such as a GPU (e.g., compute units (CU) or groups of CUs, memory, etc.). In some cases, techniques and devices discussed herein provide the advantage of appropriately choosing (e.g., by a compiler) a preferred SIMD width for making SIMD gating decisions for an application. The choice may be made at the kernel-level or at several points during a kernel's execution (e.g., basic block granularity). In some cases, techniques and devices discussed herein, advantageously, fully or partly reduce energy consumed to perform a given task, increase performance per watt/joule, guarantee that the processor operates under a power cap, and/or achieve some combination of these goals.

Currently, energy management configurations (e.g., P-states for GPU components) are chosen by a system management unit (SMU) or other hardware in a reactive manner. For example, the SMU observes the characteristics of a kernel that is running (e.g., via performance counters and/or current, power, and temperature readings) and makes decisions about the optimal energy management configuration (e.g., P-state) based on that observation. Similarly, clock gating decisions are also currently purely reactive, and clock gating is presently applied to an entire SIMD unit. Present reactive approaches are sub-optimal, as applications are often multi-phased and may transition into a new phase by the time a SMU or other energy management hardware is able to set a power management configuration (e.g., a P-state) based on the observations or adjust the number of SIMD slices that are gated off.

Accordingly, some implementations pass information regarding the application to the target processor via compiler-provided hints so that the hardware can make optimal and timely efficiency decisions.

As discussed above, current approaches to energy management in a processor (e.g., DVFS management, clock gating, etc.) are reactive only. For example, such approaches involve observing the energy consumption characteristics and performance of a workload in the processor, such as an application or kernel (e.g., compute kernel or graphics kernel) that is currently running on the processor during a certain time period, and predicting an optimal energy management state of the processor for an upcoming time period based on the observed characteristics. For example, if the energy management hardware observes (e.g., by incrementing and/or decrementing a counter based on instruction types) that the majority of instructions executed over a given time are compute-intensive (e.g., involve mathematical operations on data in local registers) as opposed to memory-intensive (e.g., involving loading data from memory into local registers), the energy management hardware may adjust an energy management state of the processor to perform optimally for compute-intensive instructions (e.g., by energizing and/or increasing the clock speed of processor components involved in compute-intensive instructions, such as SIMD units and register files, and/or de-energizing and/or decreasing the clock speed of processor components that are not involved in compute-intensive instructions, such as memory fetch hardware).

Such reactive approaches assume that an optimum energy management state of the processor for an upcoming time period is determinable based on the energy consumption characteristics of instructions executed during the observed time period. In the example, current approaches assume that upcoming instructions will be compute-intensive, in reaction to the compute-intensive characteristics of the observed instructions.

In some cases, execution of the application continues on to a group of instructions which have energy consumption characteristics different from those instructions executed during the observed time period (i.e., the application proceeds to a different phase). For example, the application may proceed from a phase where the majority of instructions are compute-intensive, to a phase where the majority of instructions are memory-intensive. Applications having multiple phases of operation with different energy consumption characteristics are referred to as multi-phasic applications herein.

Under current approaches, the energy management hardware may maintain an energy management state of the processor that is inappropriate for a new phase of operation for a period of time before the energy management hardware is able to determine that it should adjust the energy management state of the processor (e.g., until the energy management hardware has accumulated enough further observations to determine that it should adjust the energy management state of the processor based on the new phase). In some cases, this results in power inefficiencies during the time before the energy management hardware adjusts.

Accordingly, some implementations generate information that indicates (or is based on) energy consumption characteristics of an application, or of one or more phases of the application, and provide the energy management hardware with this information. The information is provided in advance of execution of the application or phase to which it pertains. In some implementations, this has the advantage of facilitating a transition to an appropriate energy management state of the processor in time for the new phase, without potential delays inherent in present reactive approaches.

In some implementations, such information indicates an energy management characteristic of the application, or of a subset of the application, such as a basic block. A basic block is a code sequence with no inbound branches, except for the start of the code sequence, and no outbound branches, except for the end of the code sequence. In some implementations, the energy management characteristic includes whether the application or subset of the application is compute-intensive, memory-intensive, or cache-intensive, for example.

In some implementations, the information indicates a preferred energy management configuration for the processor, or one or more components, clock domains, power domains, or other portions of the processor. In some implementations, the information indicates, for the processor or a portion thereof, a particular DVFS state, a clock gating configuration, a power gating configuration, a SIMD width (e.g., number of SIMD lanes, or number of SIMD units each providing a number of SIMD lanes), particular components to energize or de-energize, and/or other energy management configuration. In some implementations, the configuration is based on the energy management characteristic.

The energy manager receives the information in any suitable manner, such as by receiving a compiler hint. In some implementations, a compiler hint includes information and/or an instruction inserted into the program executable of the application by the compiler. In some implementations, a compiler inserts an instruction into the program executable based on the energy management characteristic of the application (or subset thereof, such as a basic block). In some implementations, the compiler analyzes the application to determine the energy management characteristic, or receives the energy management characteristic from another source.

In some implementations, the compiler hint instruction causes a processor executing the application to write energy management information to a special purpose register, or a particular general purpose register. In some implementations, the information indicates an energy consumption characteristic (e.g., compute- or memory-intensive) or preferred energy management state of the processor (e.g., DVFS state or SIMD width). In some implementations, the information indicates a characteristic or preferred state for the entire application (e.g., the entire kernel), for one subset of the application (e.g., one phase of the application or basic block of the kernel), or for several subsets of the application.

The energy management hardware receives the energy management information in any suitable manner, such as by reading the contents of a special purpose register, by reading a particular general-purpose register designated for this purpose, or by reading any other suitable register, buffer, memory, line, etc.

In some implementations, a compiler generates an application executable, which includes compiler hint instructions which include or indicate energy management information, based on an energy efficiency-aware optimization pass. In some implementations, the compiler hints are generated by the compiler based on static analysis and/or dynamic analysis of the application code or portions of the application code.

In some implementations, static analysis techniques are applied to the application code as executed by a model of the target processor to estimate energy consumption characteristics of the application code, or smaller segments of the application code (e.g., basic blocks of the application code). Examples of static analysis include calculating the number of instructions, types of instructions and/or slack per memory instruction (e.g., by predicting its availability in different levels of cache in the model) in a basic block of the application code, to determine an energy consumption characteristic of the basic block. Further examples of static analysis include calculating the percentage of time spent by the basic block as a compute-intensive application (i.e., executing compute-intensive instructions).

In some cases, static analysis provides the advantage of determining energy consumption characteristics of the application without running the application on a physical target processor. On the other hand, in some cases, the accuracy of static analysis approaches to determining energy consumption characteristics of the code depends on how accurately the target processor is modeled.

In some implementations, dynamic analysis techniques, such as dynamic profiling, are applied to the application code as executed by a physical target processor to estimate energy consumption characteristics of the application code, or smaller segments of the application code (e.g., basic blocks of the application code). Such dynamic analysis includes assembling the application code into a binary executable and running the executable on the target processor. In some implementations, the executable is profiled during execution using one or more suitable profiling tools, such as CodeXL, ROCm, Profiler, or rocprofiler. In some implementations, the profiling extracts performance counters and/or other runtime information usable to determine energy consumption characteristics of the application code and/or portions (e.g., basic blocks) of the code. In some implementations, the compiler or other mechanism determines the energy consumption characteristics (e.g., memory-intensiveness). In some implementations, only a subset of the application, or a subset of the portion of the application, is executed on the target processor, and characteristics of the application or portion thereof are determined (e.g., extrapolated) based on the subset. In some implementations, the subset of the application or portion of the application includes a threshold number of instructions or a threshold amount of code sufficient to determine the energy consumption characteristics with a particular desired accuracy and/or reliability.

Figure 3:
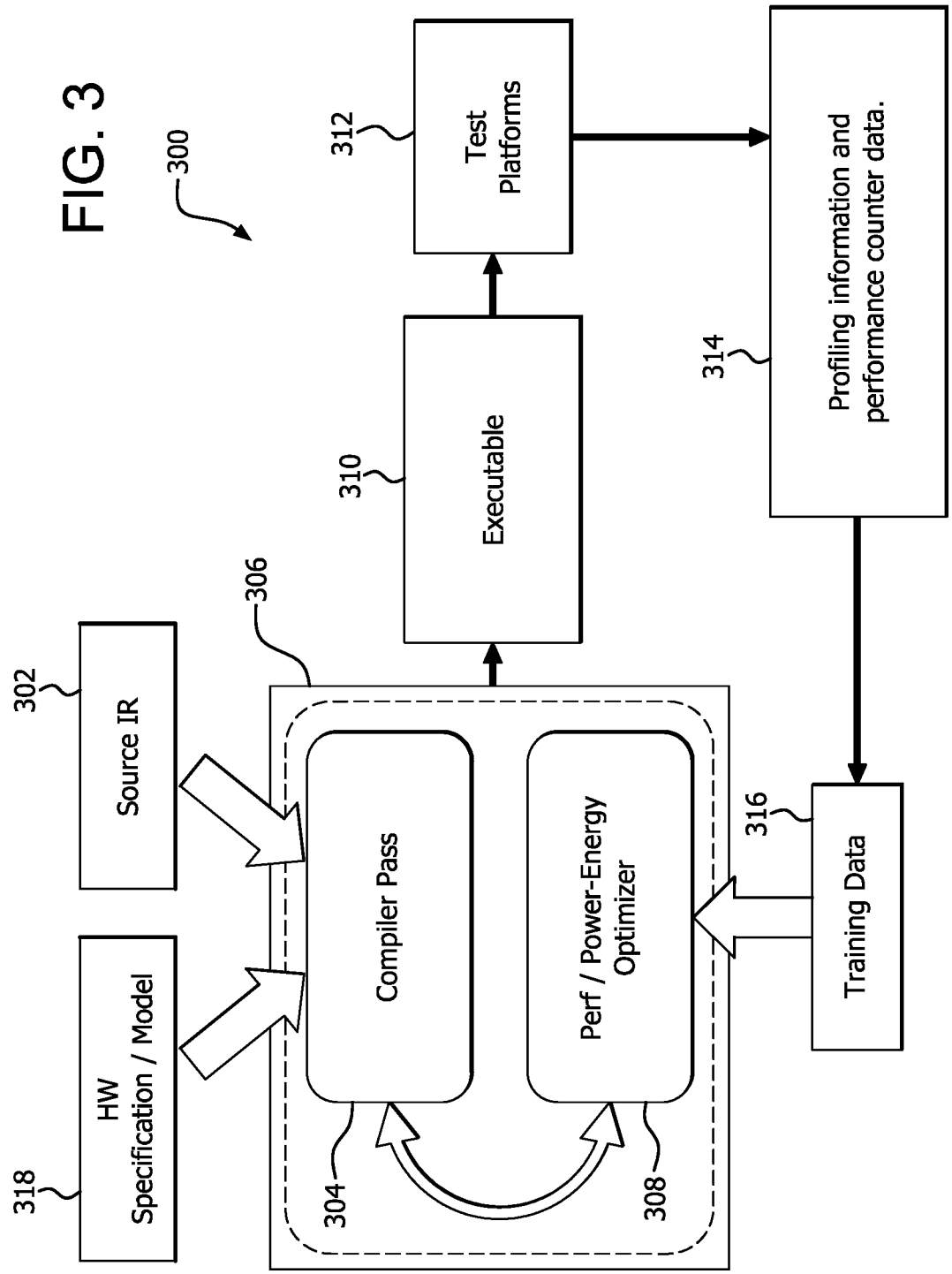
FIG. 3 is a flow chart illustrating an example compilation procedure.

FIG. 3 is a flow chart illustrating an example compilation procedure 300 which includes an energy efficiency-aware optimization pass.

A compiler front-end generates a source intermediate representation ("IR") 302 of the input GPU application. In some implementations, the source IR 302 is generated using LLVM (sometimes referred to as "low level virtual machine") to yield an LLVM IR.

In compiler pass 304, compiler 306 generates an architecture-optimized IR based on source IR 302 and a hardware specification (or model) 318 which describes the processor on which the compiled application is intended to run (e.g., a particular GPU). In this example, architecture-optimization includes optimizing the code based on the specific number of registers, scratchpad space, and/or other aspects of the specific architecture, and is omitted in some implementations. In some implementations, a code generator or other feature of compiler 306 generates an optimized instruction set architecture (ISA) based on the architecture-optimized IR. In this example, ISA optimization includes optimizing the instruction set based on the IR, e.g., by combining one or more operations, such as add and multiply, to form a fused multiply-add instruction, and is omitted in some implementations.

In energy optimization pass 308, the compiler analyzes the architecture-optimized IR using static analysis techniques (e.g., as discussed above) to determine energy consumption characteristics of the application, or portions of the application (e.g., of each basic block of the application) and generates compiler hints based on the energy consumption characteristics. In some implementations, compiler 306 determines the energy consumption characteristics based on static heuristics known to correlate with sensitivity to certain energy management configurations, such as DVFS settings or SIMD width. Examples of such static heuristics include the ratio of memory-intensive (e.g., instructions which access memory) instructions to compute-intensive (e.g., instructions which access an ALU or MACC), number of branches, number of waitcnts (e.g., instructions which delay further execution, e.g., in its wavefront, until a counter or clock reaches a specified value), instructions between waitcnts, memory space accesses, etc. In some implementations, such static heuristics have the advantage of effectively correlating the energy consumption characteristics of the application or portion of the application with a particular known energy management setting or combination of settings, such as a particular SIMD width or DVFS state.

In some implementations, this process is iterative (indicated by a curved arrow in the figure) and compiler pass 304 is executed again to generate code based on the information generated by energy optimization pass 308.

After the energy optimization pass 308, compiler 306 generates an executable 310. Executable 310 includes hints inserted by the compiler to indicate energy management characteristics of the application or sections thereof, or preferred energy management states of the target processor, or portions thereof. In some implementations, the hints are provided as instructions, e.g., which cause the target processor to store information indicating the energy management characteristics or preferred energy management states of the target processor to a special purpose register of the target processor, a particular general-purpose register of the target processor, or a plurality of such registers, or other suitable registers, buffers, or memory, etc.

In some implementations, dynamic analysis techniques, such as dynamic profiling, are applied to the application code. For this purpose, executable 310 is run on the target processor, which is installed in a test platform 312 in this example. Test platform 312 and/or the target processor profile the application, or portions (e.g., basic blocks) of the application, to generate profiling information 314. Profiling information 314 includes, for example, performance counter data, or other information usable to determine energy consumption characteristics of the application, or portion of the application, e.g., by compiler 306. In some implementations, test platform 312 includes a plurality of target processors, and a plurality of architecture-optimized executables are run on the target processors to generate profiling information corresponding to each.

Profiling information 314 is fed back to the compiler 306 as training data 316, which determines energy consumption characteristics (e.g., memory boundedness, compute-intensiveness or memory intensiveness, etc.) based on the training data 316. In some implementations, compiler 306 updates the energy consumption characteristics of the application in another iteration of energy optimization pass 308, and recompiles the application into an updated executable 310.

In some implementations, compiler 306 uses the training data 316 for a machine learning model configured to infer the energy consumption characteristics of the application, or energy management settings for the target processor, etc., to incorporate into corresponding compiler hints. For example, in some implementations, the training data 316 is input to an optimization model which determines energy consumption characteristics of the application or portions thereof. In some implementations, the optimization model includes an artificial neural network (ANN), e.g., configured to infer the energy consumption characteristics based on training data 316.

In some implementations, the dynamic analysis is iterative. For example, the updated executable 310 is run on the target processor of test platform 312, and updated profiling information 314 is fed back to the compiler 306 as training data 316 to further update the executable 310. In some implementations, iteration continues until a desired condition occurs, such as until subsequent iterations yield no changes in the determined energy consumption characteristics of the application or portions thereof. In some implementations, the dynamic analysis proceeds for a predetermined and/or fixed number of iterations.

Energy consumption characteristics of the application and/or preferred energy management states of the target processor corresponding to these characteristics (e.g., of the kernel or basic blocks of the kernel) that are "learned" by the compiler are passed to the target processor. In some implementations, this information is passed by writing a value corresponding to the characteristic or characteristics to a special purpose register of the target processor, a general purpose register, or any defined location where energy management hardware of the target processor (e.g., a DVFS manager) can access the information. The value is written to the special purpose register or other location via an assembly instruction inserted into the application code prior to compilation into an executable, or in any other suitable way. In some implementations, the assembly instruction comprises a special register instruction. In some implementations, such information is stored in different locations (e.g., different special purpose registers) for each wavefront within a CU, or stored in a location shared by more than one of the wavefronts.

Passing compiler hints indicating the energy consumption characteristics and/or preferred energy management configuration information in this way has the advantage of facilitating fine grained temporal energy management (e.g., DVFS) control at arbitrary points within an application in some cases.

In some implementations, the compiler hint instruction (e.g., special register instruction) is executed by the target processor (e.g., by a CU of the target processor) in early stages of the core pipeline to ensure timely receipt of the information by the energy management hardware (e.g., by a DVFS manager). In some implementations, a compiler hint instruction indicating global energy consumption characteristics and/or energy management configuration preferences for the entire kernel are passed to the target processor when the kernel is queued for execution. In some implementations, a compiler hint instruction indicating energy consumption characteristics and/or energy management configuration preferences for a plurality of phases of the kernel are passed to the target processor when the kernel is queued for execution, or at arbitrary points during execution of the application (e.g., such that energy management hardware can adjust the energy management configuration accordingly before the phase is executed).

In some implementations, energy management hardware of the target processor includes a DVFS manager. In some cases, the DVFS manager can choose one of several possible DVFS policies to implement based on information received about the energy management characteristics of upcoming basic blocks. In some examples, a DVFS manager assigns a deep sleep state to CUs running basic blocks or kernels that are memory-intensive and/or exhibit streaming behavior (e.g., leading to cache misses and memory accesses). In some examples, the DVFS manager changes one or more power states (e.g., voltage, frequency, number of active SIMD units, etc.) of the CUs based on information received about the energy management characteristics of upcoming basic blocks (e.g., to speed up CUs in preparation of upcoming compute-intensive workloads). In some implementations, the DVFS manager or other energy management hardware determines that the power configuration should change based on based on energy management characteristics of all wavefronts active on CUs within a particular clock domain.

In some implementations, energy management hardware of the target processor includes hardware configured to gate SIMD units of the target processor to adjust the SIMD width. In some cases, the compiler adds instructions to provide the hardware with information indicating a preferred SIMD width (or from which the preferred SIMD width is determinable) for a kernel, basic block, or other subset of the application. In some implementations, the preferred SIMD width is for all threads in the application, for a subset of threads, for individual wavefronts, or any other suitable subdivision of the application or kernel. In some implementations, a single thread sets the preferred SIMD width for all of the threads or other subdivisions. In some implementations, each wavefront includes an instruction to indicate its individual SIMD width preference. In some implementations, the SIMD width preference is consistent over the entire lifetime of the application kernel. In other implementations, the SIMD width preference is "phasic" and changes for different phases of the application kernel (e.g., for different basic blocks or groups of basic blocks). In phasic cases, the compiler adds instructions at suitable points in the application code to update the energy management hardware (e.g., SIMD width manager) of the SIMD width preference dynamically during runtime. In some implementations, the added compiler hint instructions indicate the preferred SIMD width. In some implementations, the added compiler hint instructions indicate that the energy management hardware should set the SIMD width based on various dynamic conditions. In an example, an instruction indicates that the SIMD width should be set to a certain width "X" only if condition "Y" occurs, where Y is an event threshold. In this example, Y tracks a number of cache misses, or the waitcnt stall cycles. In some cases, the number of cache misses and/or waitcnt stall cycles indicates a degree to which a wavefront is memory-bound or memory-intensive. If Y goes beyond some threshold for a given time period, the hardware can then alter the SIMD width to X. Any suitable threshold or combination of thresholds are usable with any suitable condition or combination of conditions.

Figure 4:
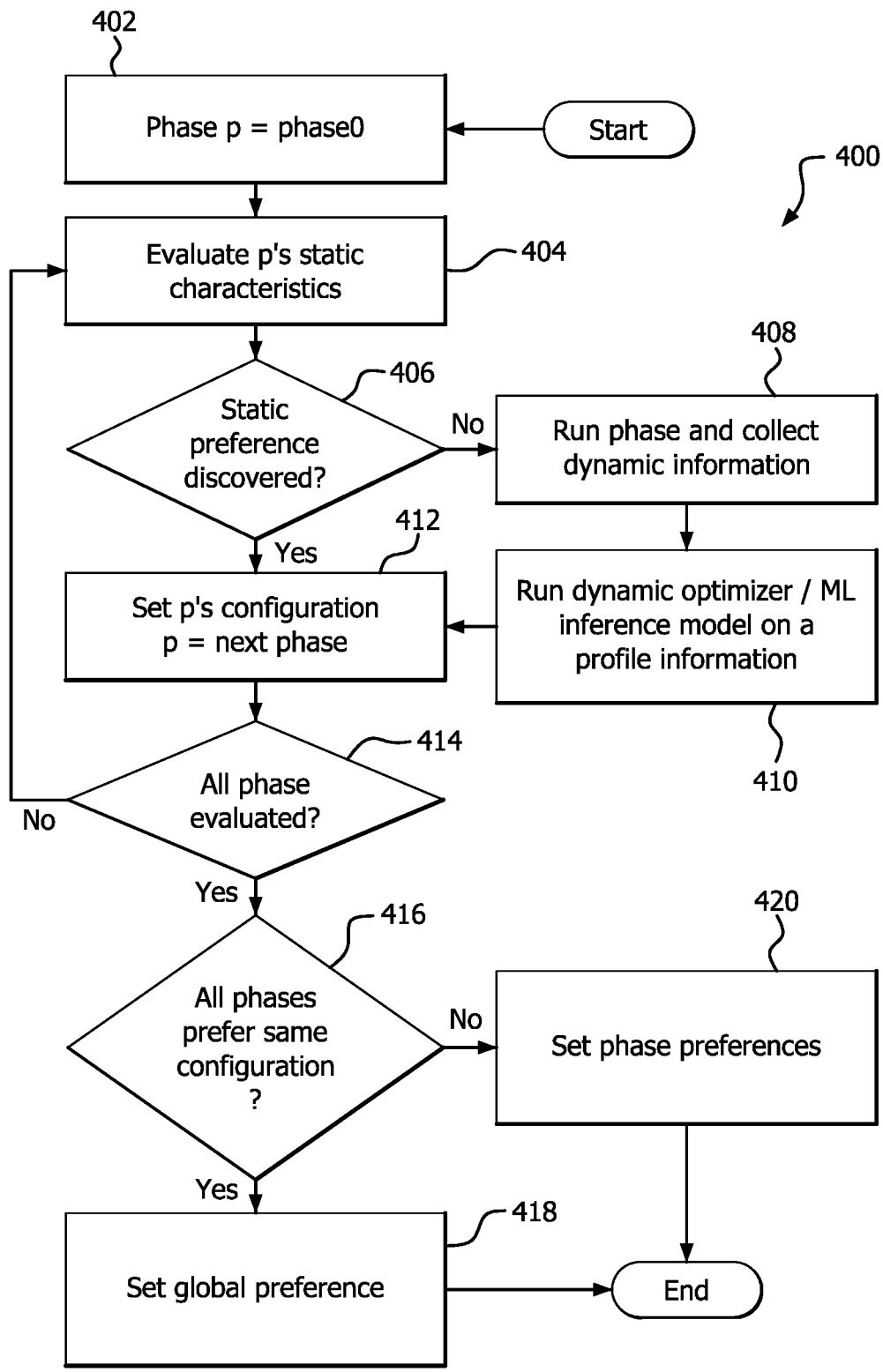
FIG. 4 is a flow chart illustrating an example compiler optimization pass.

FIG. 4 is a flow chart illustrating an example compiler optimization pass 400. In this example, each phase of operation (e.g., basic block) is analyzed statically, and may be evaluated dynamically if the static analysis does not adequately determine an energy consumption characteristic and/or preferred energy management configuration of the phase (e.g., that it is compute-intensive, memory intensive, etc.) In other implementations, both analyses are conducted in all cases.

In step 402, the application phase is set as phase 0. In this example, the phases of the application are tracked using an incrementing counter. This approach and nomenclature is exemplary only; any suitable tracking of application phases is usable in other implementations.

In step 404, the compiler performs a static evaluation of the energy consumption characteristics and/or preferred energy management configuration of phase 0 of the application, e.g., using the static analysis techniques discussed herein.

On condition 406 that the static analysis successfully determines an energy management characteristic and/or preferred energy management configuration of the phase, the compiler increments the counter in step 412. Otherwise, on condition 406 that the static analysis does not successfully determine the energy management characteristic and/or preferred energy management configuration of the phase, a dynamic analysis of the phase is performed. For example, in step 408, the application phase is compiled and run on a target processor and profiling information is collected, e.g., as described herein. In step 410, dynamic analysis techniques are applied to the phase based on the profiling information, e.g., as discussed herein, to determine the energy consumption characteristics and/or preferred energy management configuration of the phase. In some implementations, a dynamic optimizer (e.g., a machine learning inference model) is run on the profiling information to determine the energy consumption characteristics and/or preferred energy management configuration of the phase. It is noted that in some implementations, dynamic analysis of the phase is performed regardless of whether static analysis successfully determines an energy management characteristic and/or preferred energy management configuration of the phase or not on condition 406. For example, in some such implementations, execution proceeds from condition 406 through step 408 and step 410 to step 412 regardless of whether static analysis successfully determines an energy management characteristic and/or preferred energy management configuration of the phase or not on condition 406.

On condition 414 that all phases have not yet been evaluated, the phase counter is incremented to indicate the next phase and the flow returns to step 404. Otherwise, on condition 416 that all of the phases have the same energy consumption characteristics and/or prefer the same energy management configuration, a global preference is set for the application by the compiler in step 418. For example, the compiler may insert a compiler hint instruction indicating the energy consumption characteristic and/or preferred energy management configuration into the application code.

Otherwise, on condition 416 that all of the phases do not have the same energy consumption characteristics and/or prefer the same energy management configuration, a preference is set for each phase the application (or for groups of phases, or other subsets of the application) by the compiler in step 420. For example, the compiler may insert a compiler hint instruction indicating the energy consumption characteristic and/or preferred energy management configuration of each phase into the application code.

In some implementations, after preferences are set (globally and/or per phase), the compiler compiles the application code to generate an executable (or intermediate code, or other code upon which an executable is generatable). In some implementations, a processor running the executable consumes less energy or otherwise exhibits preferable energy consumption characteristics than the processor running an executable generated based on the application code without inserted preferences.

Some classes of target processors, such as certain GPUs, typically execute multiple wavefronts simultaneously (e.g., each on a separate SIMD unit of a compute unit (CU)). For example, if multiple wavefronts are each running an instruction from a different basic block of the application on a different SIMD, the CU may be operating under a sub-optimal energy management configuration (e.g., a sub-optimal power state or SIMD width) for some of the wavefronts for at least part of the time the application is running.

Accordingly, some implementations set an energy management configuration of a CU globally (e.g., for all SIMD units and/or all active wavefronts of the CU) based on the preferred energy management configurations of all of the active wavefronts executing on the CU (e.g., by voting, averaging, mean, mode, etc. of the preferred energy management configurations). Alternatively, some implementations set an energy management configuration of a CU globally based on the preferred energy management configuration of the highest priority active wavefront executing on the CU.

For example, one or more CUs within an independent clock domain may be assigned a power state based on all the active wavefronts executing on these CUs. In another example, all SIMD units of a CU are gated based on the active wavefronts executing on the SIMD. In some implementations, this configures an energy manager (e.g., a DVFS manager) with an energy management configuration (e.g., a power state and/or SIMD width that is most suitable for the greatest number of the wavefronts possible.

In some implementations, most wavefronts are operating within the same basic block for the majority of the time. During times when wavefronts are operating in different basic blocks, the configuration is set based on the wavefronts in any suitable manner, e.g., by determining an average energy management configuration preference of the wavefronts, or by taking a vote of the wavefronts (e.g., setting the configuration based on a decision of a majority of the wavefronts), to avoid or minimize performance loss due to energy management preference mismatch.

Some implementations set an energy management configuration of a CU globally based on the preferred energy management configuration of a highest priority active wavefront executing on the CU. In some implementations, the active wavefronts are prioritized depending on the type of resource (e.g., SIMD, scratch pad, and/or global memory pipeline, etc.) they use or based on their criticality (e.g., critical to workload completion). In some implementations, the CU power state, SIMD width, or other energy management configuration is updated each time the priority order of the wavefronts changes, such that the power state, SIMD width, or other energy management configuration is optimized for the highest-priority wavefront.

In some implementations, the preferred or optimal energy management configuration of a wavefront is maintained in a field (e.g., a register) within a wavefront context (i.e., the register space available to the wavefront). In some implementations, each CU maintains a table that records an optimal efficiency configuration for each active wavefront. The table is referenced (e.g., by energy management hardware, such as a DVFS manager), e.g., after each context switch, to restore the CU to a preferred, correct, or optimal state. In some implementations, a prioritization policy prioritizes the wavefront utilizing a vector ALU, prioritizes the critical wavefront (e.g., a wavefront which would lead a workload to finish without waiting on other wavefronts), or prioritizes a wavefront based on any other suitable condition.

Figure 5:
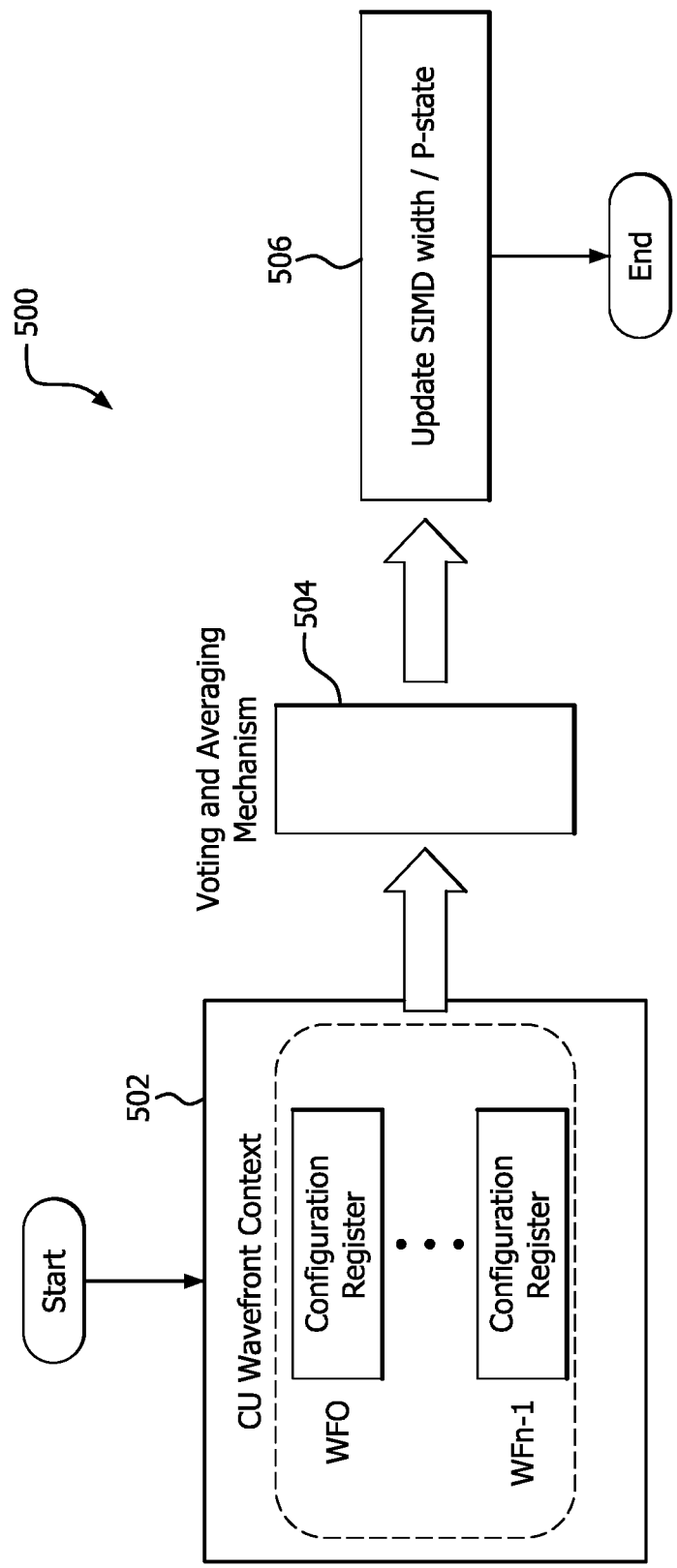
FIG. 5 is a block diagram illustrating example hardware for determining and setting an energy management configuration.

FIG. 5 is a block diagram illustrating example hardware 500 for determining and setting an energy management configuration of a CU globally based on the preferred energy management configurations of all of the active wavefronts executing on the CU. The example of FIG. 5 sets the energy management configuration per CU, however in other implementations the energy management configuration is set per group of CUs (e.g., per clock domain including a plurality of CUs, per power domain including a plurality of CUs, etc.) based on the active wavefronts of those CUs.

In this example, a CU wavefront context 502 includes a configuration register for each of n active wavefronts WF0-WFn−1. Each configuration register indicates a preferred energy management state of the target processor for the corresponding wavefront. For example, in some implementations, each configuration register indicates a preferred SIMD width and/or power state (e.g., voltage, frequency value, etc.).

Voting hardware 504 inputs the values of the configuration registers and determines a suitable global energy management state of the CU. In this example, voting hardware 504 averages the values of the configuration registers to determine the suitable global energy management state of the CU. In other implementations, voting hardware 504 determines a suitable global energy management state of the CU by determining a mean, mode, or performing any other suitable calculation based on the values of the configuration registers. In some implementations, the values of the configuration registers are weighted, e.g., by a priority of the wavefront. In some implementations, voting hardware 504 determines which of active wavefronts WF0-WFn−1 has the highest priority, and selects the preferred energy management state of that wavefront as the global energy management state for the CU (e.g., sets the preferred SIMD width of that wavefront for all active wavefronts on the CU). In some implementations, voting hardware 504 updates its determination when a priority order of active wavefronts WF0-WFn−1 changes, periodically, after a counter expires, on receipt of a signal, or based on any other suitable condition.

Energy management state updating hardware 506 updates the energy management state of the CU based on the output of voting hardware 504. In this example, energy management state updating hardware 506 sets a global SIMD width and/or power state for the CU. In other implementations, Energy management state updating hardware 506 sets any suitable global energy management configuration for the CU. In some implementations energy management state updating hardware 506 updates the energy management state of the CU each time the output of voting hardware 504 changes, periodically, after a counter expires, on receipt of a signal, or based on any other suitable condition.

Figure 6:
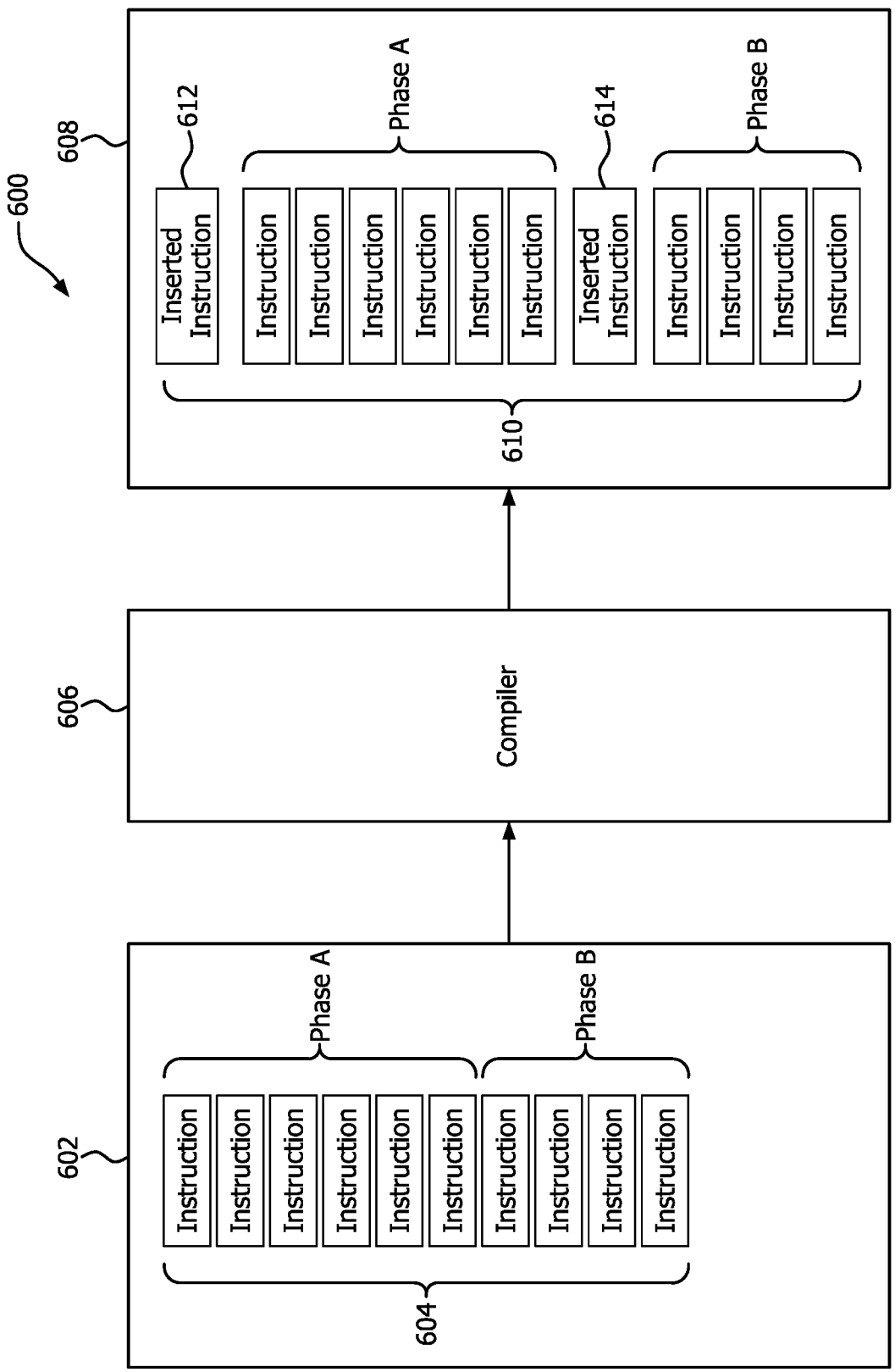
FIG. 6 is a flow chart illustrating an example method for insertion of a compiler hint instruction into application code.

FIG. 6 is a flow chart illustrating an example method 600 for insertion of a compiler hint instruction into application code by a compiler to yield energy consumption optimized application code. In this example, application code 602 includes a plurality of instructions 604. The instructions 604 fall into two phases of operation, phase A and phase B. The majority of instructions in phase A are memory-intensive (e.g., are mostly load or store instructions which transfer data or instructions between memory and registers of the target processor, using (or primarily using) a memory address register (MAR) memory buffer register (MBR), address bus, data bus, and/or other memory-specific hardware of the target processor). The majority of instructions in phase B are compute-intensive (e.g., are mostly instructions which perform mathematical operations on data in the registers using (or primarily using) an arithmetic logic unit (ALU), multiply accumulator (MACC), or other compute-specific hardware of the target processor).

Application 602 is input to compiler 606, which analyzes application 602 to determine energy consumption characteristics of application 602 and/or preferred energy management configurations for the target processor based on the energy consumption characteristics. In this example, the compiler identifies two phases of operation of application 602, corresponding to phase A and phase B within instructions 604. In this example, phase A and phase B correspond to separate basic blocks of a kernel corresponding to application 602, and are defined as separate phases and analyzed for energy consumption characteristics on that basis. In other implementations, different sections of an application are defined as phases and analyzed for energy consumption characteristics based on any other suitable criterion.

Compiler 606 determines that phase A has the energy consumption characteristic that it is memory-intensive, and that phase B has the energy consumption characteristic that it is compute-intensive. Compiler 606 makes this determination based on whether the majority of instructions (or a threshold percentage of instructions, etc.) in the phase are memory-intensive or compute-intensive, however, in other implementations, the determination is made in any suitable manner from among these or any other suitable energy consumption characteristics, e.g., as discussed herein.

Compiler 606 generates energy consumption optimized application code 608, which includes instructions 610, by inserting a compiler hint instruction 612 before (i.e., earlier in the execution order than) the instructions of phase A, and inserting a compiler hint instruction 614 before the instructions of phase B. In other implementations, the compiler hints for phase A and phase B are inserted in the same instruction before both phase A and phase B, or in any other suitable manner that provides the energy consumption characteristic or preferred energy management configuration information to the target processor in enough advance time for the target processor to adjust its energy management configuration accordingly for each phase.

In this example, the compiler operates on assembly instructions compiled from source code for the application. In other implementations, the compiler operates on any suitable representation of the application, such as an IR, machine code, or other suitable representation.

In some implementations, the compiler (or another compiler, or another device) compiles the energy consumption optimized application code to yield an energy consumption optimized executable. In some implementations, a processor running the energy consumption optimized executable consumes less energy or otherwise exhibits preferable energy consumption characteristics than the processor running an executable generated based on the application code without inserted compiler hint instructions.

Figure 7:
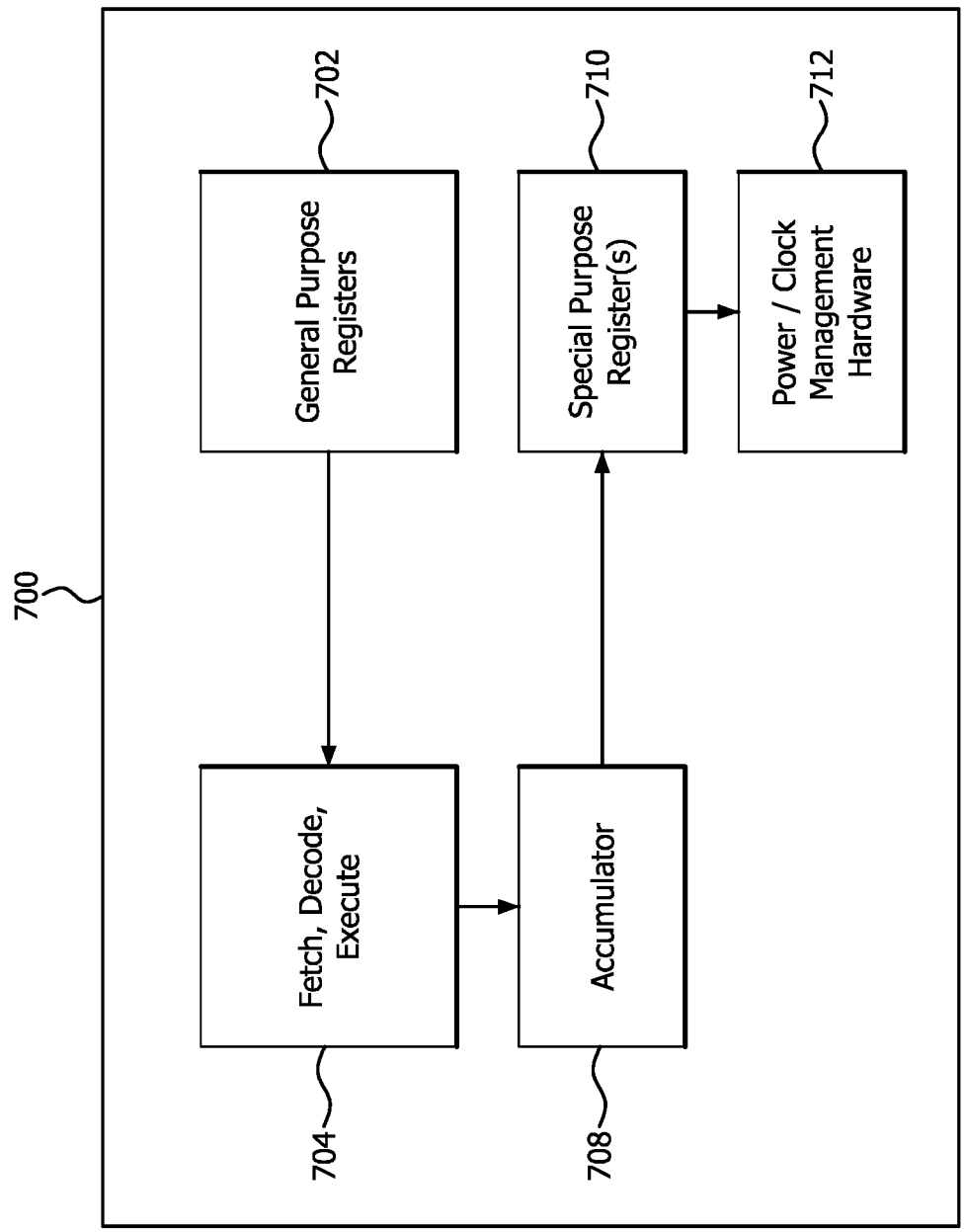
FIG. 7 is a block diagram illustrating components of an example target processor.

FIG. 7 is a block diagram illustrating components of an example target processor 700. Target processor 700 is a GPU in this example, implementable using some or all of the hardware shown and described with respect to FIGS. 1 and 2. In other implementations, the target processor is a CPU, APU, Application Specific Integrated Circuit (ASIC), Programmable Gate Array (FPGA), digital signal processor (DSP), or any other suitable general or special purpose processing device.

In this example, an executable compiled based on energy consumption optimized application code 608, shown and described with respect to FIG. 6, is stored in general purpose registers 702. Fetch, decode and execute hardware 704 fetches, decodes, and executes inserted instruction 612, shown and described with respect to FIG. 6, causing accumulator 708 to store the energy consumption characteristic (i.e., memory-intensiveness, in this example) in special purpose register 710. Power and clock management hardware 712 (e.g., a DVFS manager, clock manager, and/or other hardware) sets the energy management configuration of target processor 700 for execution of memory-intensive instructions in phase A of the energy optimized application code 608.

After phase A has been executed, fetch, decode and execute hardware 704 fetches, decodes, and executes inserted instruction 614, shown and described with respect to FIG. 6, causing accumulator 708 to store the energy consumption characteristic (i.e., compute-intensiveness, in this example) in special purpose register 710. Power and clock management hardware 712 sets the energy management configuration of target processor 700 for execution of compute-intensive instructions in phase B of the energy optimized application code 608.

Figure 8:
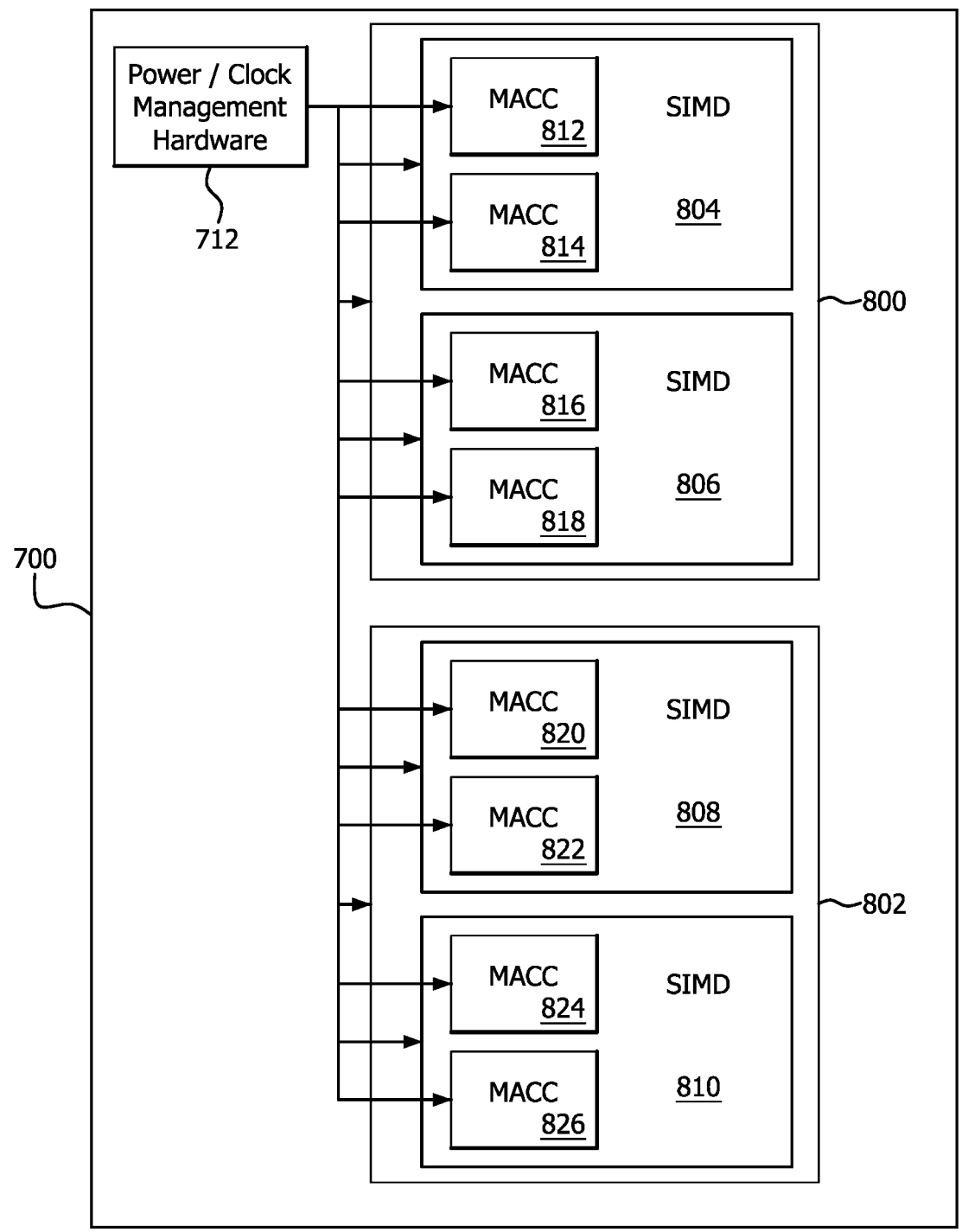
FIG. 8 is a block diagram illustrating further components of the example target processor shown and described with respect to FIG. 7.

FIG. 8 is a block diagram illustrating further components of example target processor 700. As shown in the figure, power and clock management hardware 712 controls clock and/or power for compute units 800, 802, and their subcomponents. Compute unit 800 includes two SIMD units 804, 806 and compute unit 802 includes SIMD hardware 808, 810. SIMD hardware 804, 806, 808, 810, include MACC hardware 812, 814, 816, 818, 820, 822, 824, 826. Any other suitable combination of processor hardware is usable in other implementations.

Power and clock management hardware 712 receives or otherwise obtains energy consumption characteristics and/or energy management configuration preferences from special purpose register 710, as shown and described with respect to FIG. 7. Based on the received characteristics and/or preferences, power and clock management hardware 712 configures the power level and/or clock rate of various components.

For example, if power and clock management hardware 712 determines that each of compute units 800, 802, should run with half of their maximum SIMD width, it may reduce power to or power-off one of the two SIMDs in each of compute units 800, 802 for the duration of the application phase to which the received characteristics and/or preferences pertain.

In another example, if power and clock management hardware 712 determines that the instructions of the application phase to which the received characteristics and/or preferences pertain include primarily memory-intensive instructions, it may reduce power to, reduce clock frequency of, and/or power-off all of the MACC units 812, 814, 816, 818, 820, 822, 824, 826, leaving other portions of compute units 800, 802, energized and clocked for the duration of the application phase to which the received characteristics and/or preferences pertain.

In a further example, if power and clock management hardware 712 determines that the instructions of the application phase to which the received characteristics and/or preferences pertain include primarily instructions that can run on only one compute unit, it may reduce power to, reduce clock frequency of, and/or power-off compute unit 802 and all of its components, leaving compute unit 800 and all of its components energized and clocked for the duration of the application phase to which the received characteristics and/or preferences pertain.

It is noted that any suitable combination and/or permutation of these example power and/or clock configurations, or other power and/or clock configurations, are usable in other implementations. For example, an ALU or other compute hardware is controllable similar to the MACC hardware described with respect to FIG. 8.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, and so forth, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An apparatus configured to run compiled code compiled by a compiler configured to:
   determine a characteristic of code;
   insert an instruction based on the determined characteristic into the code, the instruction including an indication of the characteristic of the code;
   compile the code and inserted instruction to generate compiled code; and
   output the compiled code.

2. The apparatus of claim 1, wherein the instruction is configured to cause a target processor to write information that is based on the characteristic to a special purpose register for reading by hardware of the target processor.

3. The apparatus of claim 1, wherein the characteristic comprises a characteristic of a subset of the code.

4. The apparatus of claim 1, wherein the instruction is based on an energy consumption characteristic of the code.

5. The apparatus of claim 1, wherein the instruction indicates an energy consumption characteristic of a subset of the code.

6. The apparatus of claim 1, wherein the instruction indicates an energy management state of a target processor.

7. The apparatus of claim 1, wherein the instruction indicates a preferred clock gating configuration or a preferred power gating configuration of a target processor.

8. The apparatus of claim 1, wherein the instruction indicates a preferred single-instruction multiple-data (SIMD) width of a target processor.

9. The apparatus of claim 1, wherein the instruction comprises a compiler hint.

10. An apparatus configured to run compiled code compiled by a computing device configured to compile code, the computing device comprising:
    circuitry configured to determine a characteristic of code;
    circuitry configured to insert an instruction based on the characteristic into the code, the instruction including an indication of the characteristic of the code;
    circuitry configured to compile the code and inserted instruction to generate compiled code; and
    circuitry configured to output the compiled code.

11. The apparatus of claim 10, wherein the instruction is configured to cause a target processor to write information that is based on the characteristic to a special purpose register for reading by hardware of the target processor.

12. The apparatus of claim 10, wherein the characteristic comprises a characteristic of a subset of the code.

13. The apparatus of claim 10, wherein the instruction is based on an energy consumption characteristic of the code.

14. The apparatus of claim 10, wherein the instruction indicates an energy consumption characteristic of a subset of the code.

15. The apparatus of claim 10, wherein the instruction indicates an energy management state of a target processor.

16. The apparatus of claim 10, wherein the instruction indicates a preferred clock gating configuration or a preferred power gating configuration of a target processor.

17. The apparatus of claim 10, wherein the instruction indicates a preferred single-instruction multiple-data (SIMD) width of a target processor.

18. The apparatus of claim 10, wherein the instruction comprises a compiler hint.

19. An apparatus comprising a processor and configured to:
    execute an executable compiled from code, wherein the executable comprises an instruction based on a characteristic of the code, the instruction including an indication of the characteristic of the code;
    wherein execution of the instruction writes information to a register of the processor.

20. The apparatus of claim 19, wherein the information comprises an energy consumption characteristic or an energy management state.

* * * * *